E. KANDLER.
OPHTHALMIC TEST LENS TRAY.
APPLICATION FILED MAY 27, 1918.
1,297,357.
Patented Mar. 18, 1919.
2 SHEETS—SHEET 1.
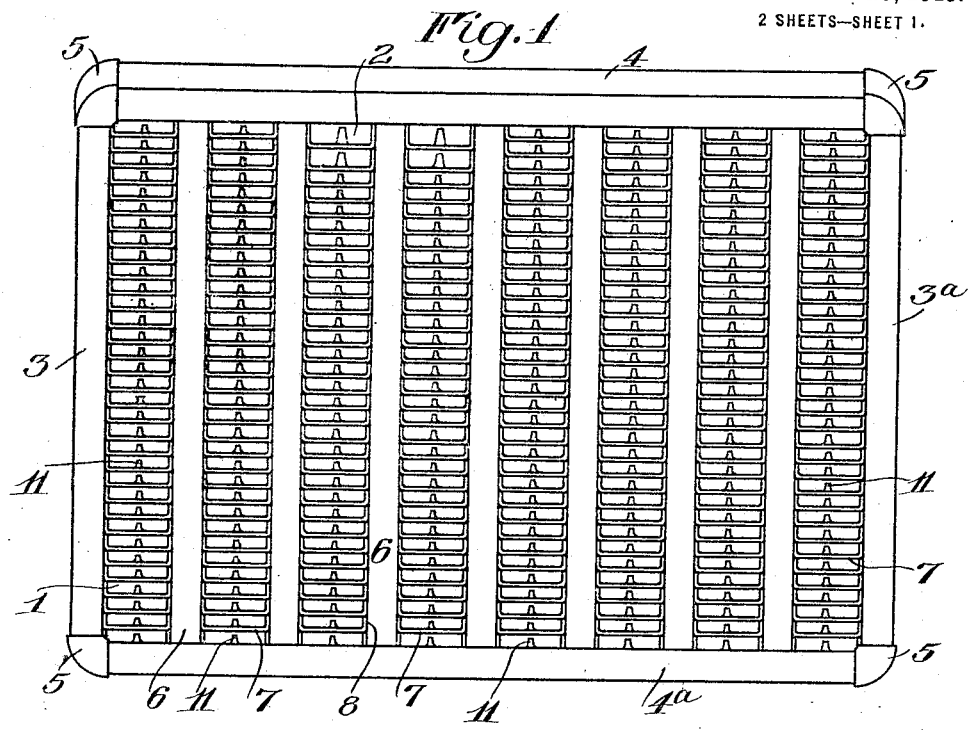
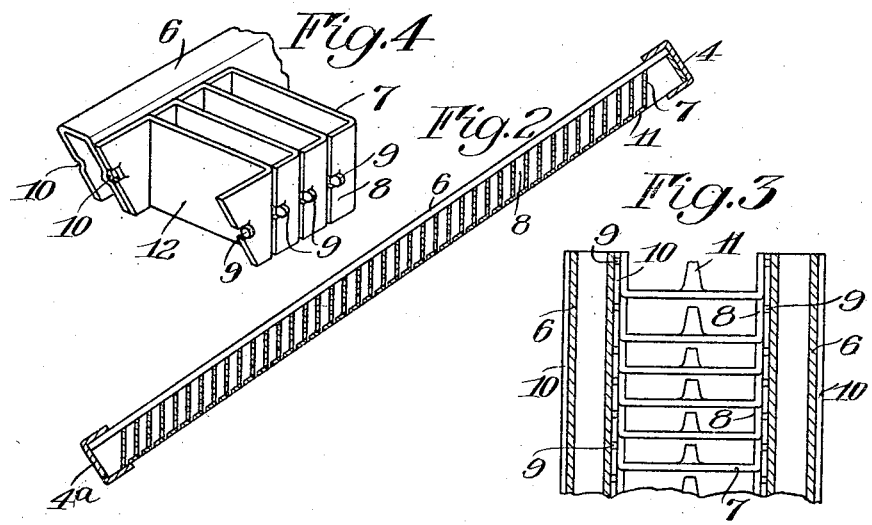
Inventor
Edmund Kandler
by Church & Rich
his Attorneys E. KANDLER.
OPHTHALMIC TEST LENS TRAY.
APPLICATION FILED MAY 27, 1918.
1,297,357.
Patented Mar. 18, 1919.
2 SHEETS—SHEET 2.
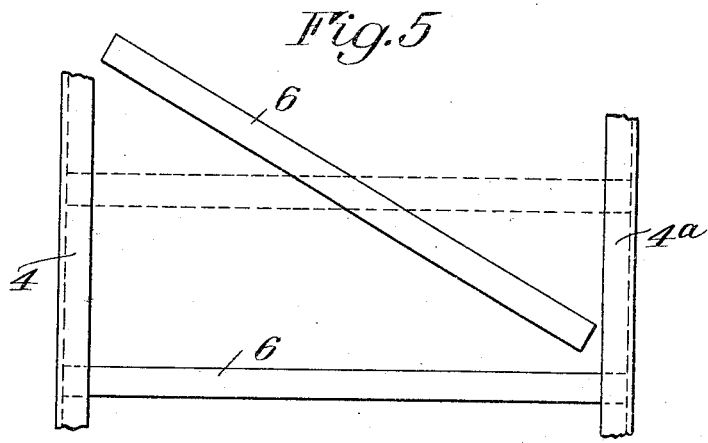
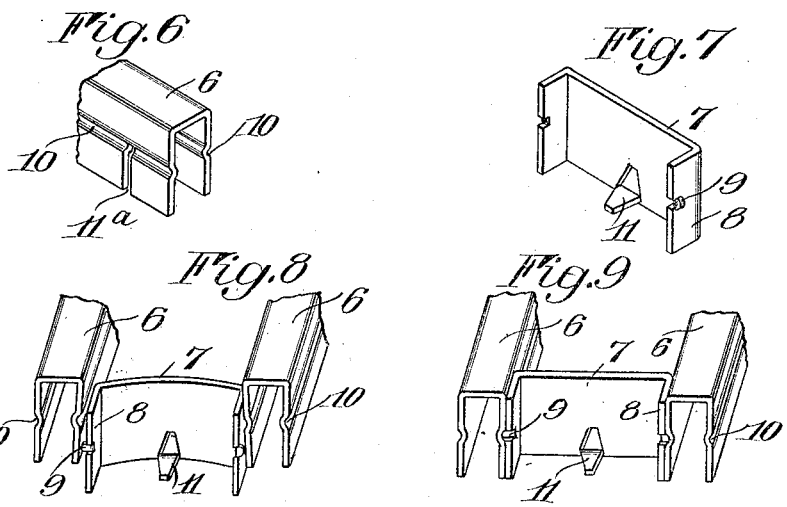
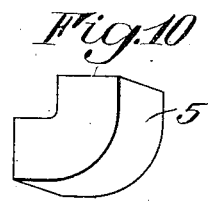
Inventor
Edmund Kandler
by Church & Rich
his Attorneys

UNITED STATES PATENT OFFICE.

EDMUND KANDLER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC TEST-LENS TRAY.

1,297,357.  Specification of Letters Patent.  Patented Mar. 18, 1919.

Application filed May 27, 1918. Serial No. 236,883.

*To all whom it may concern:*

Be it known that I, EDMUND KANDLER, a citizen of the United States, residing at Rochester, in the county of Monroe and State of New York, have invented certain new and useful Improvements in Ophthalmic Test-Lens Trays; and I do hereby declare the following to be a full, clear, and exact description of the same, reference being had to the accompanying drawings, forming a part of this specification, and to the reference numerals marked thereon.

This invention relates to that class of trays used for holding the various lenses of an ophthalmic test lens set, such as are employed by opticians in testing the refractive properties of a patient's eyes preparatory to fitting eyeglasses. The object of the invention is to provide an improved sanitary tray for ophthalmic test lenses of the kind described in my pending application Serial No. 144,351, filed January 25, 1917. To these and other ends the invention consists in certain improvements and combinations of parts, all as will be hereinafter more fully described, the novel features being pointed out in the claims at the end of the specification.

In the drawings:

Figure 1 is a plan view of a test lens tray constructed in accordance with my invention;

Fig. 2 is a transverse sectional view of the device shown in Fig. 1;

Fig. 3 is an enlarged sectional plan view of a pair of the inner channel partitions of the tray, one end being broken away, and showing the partition plates in position thereon;

Fig. 4 is a perspective of one of the channel partitions with the partition plates in position thereon, one end being broken away;

Fig. 5 is a diagrammatic view of the frame showing the manner of positioning the channel partitions thereon;

Fig. 6 is a perspective view of one of the channel partitions, one end being broken away;

Fig. 7 is a perspective view of one of the partition plates;

Figs. 8 and 9 are perspective views of a pair of channel partitions of modified form, one end being broken away, and Figs. 10 and 11 are perspective views of a corner for the frame shown in different positions.

Similar reference numerals in the several figures indicate the same parts.

My improved test lens tray may be made of any form and of any size required to include the requisite number of narrow lens chambers 1, which may receive comparatively thin spherical and cylindrical lenses, and a comparatively few, say four, wider chambers 2 which may receive thicker prismatic lenses. The frame of the tray comprises two sheet metal channel end portions 3 and 3ª, and front and rear sheet metal channel frame portions 4ª and 4. At the adjacent ends of the frame and end portions, or the corners of the frame, the adjacent ends of the members 3, 3ª and 4, 4ª are connected by means of sheet metal corner members 5, as shown in Figs. 10 and 11, struck up to fit over the ends. The frame, when assembled in this manner, presents a pleasing neat appearance with round corners and possesses the qualities of lightness, rigidity and durability.

In the construction illustrated, the lens chambers 1 and 2 are entirely open at the top and only slightly obstructed at the bottom. Said chambers are formed by a series or plurality of substantially parallel inner metal channel partitions 6, of which seven are illustrated in the drawings, and two end frame portions 3 and 3ª, also substantially parallel therewith. The spaces formed between the members 3, 3ª, 6, 4 and 4ª are subdivided by a series or plurality of flat sheet metal plates substantially parallel with the frame members 4 and 4ª into a series or plurality of chambers 1 and 2, described above. The partitions 6 are spaced substantially equidistant from each other and from the end frame members 3 and 3ª, forming a series or plurality of substantially parallel elongated chambers, each of which is subdivided by the plates 7 into a series or plurality of lens chambers or cells 1, 2. The sheet metal frame portions 3, 3ª, 4 and 4ª are struck up from sheet metal substantially U-shaped in cross section, with the open sides directed inwardly. The obliquely arranged lens chambers 1 and 2 are formed by a series of partition plates 7, each of which is provided with a flange 8 at each end bent up at substantially right angles to the body of the plate. When assembled, these flanges contact the adjacent plate and space the plates to determine the width of the lens chambers or cells. Projecting ears or lugs 9 are provided on the flanges 8, and are preferably formed by striking out the material of the flanges. The channel partitions 6 have longitudinal grooves or slots 10 pressed in their outer walls and transverse slots or grooves 11ª lead thereto from the bottom of the partition. In assembling, the ears or lugs 9 are led in through the grooves 11ª and moved along the channel partitions in the grooves 10 in which the partition plates are supported. A tongue or projecting lug 11 is struck up from each of the partition plates and projects across the bottom of the cell and provides a means for supporting a lens in the chamber or cell. These partition plates 7 are moved along the channel partitions into contact with each other to form the rows of lens cells shown in Fig. 1. At the front or bottom of each row of partition plates 7 is placed a base or foundation plate 12 similar to the plates 7 but having its end flanges tapered. The lower edges of the plates 12 rest directly upon the front tray frame member 4ª, and the tapered edges of the flanges cause it to assume an oblique or inclined position, which position is transmitted to all the other partition plates in the row, as will be understood from the drawings. If desired, the lug 11 may be omitted from the end plates 12, since a lens inserted in the cell formed thereby would rest directly on the frame member 4ª.

By forming each lens chamber or cell of a single partition plate, as described above, the partition plates may be struck up in quantities having the flanges 8 of varying lengths and also in standard sizes, which may be employed in making up any desired grouping of lens cells of varying widths. The channel partitions and marginal frame bars may also be rolled in standard form and produced inexpensively. If desired, the end plates 12 may be replaced by partition plates of standard form, such as shown in Fig. 7, in which case the cells will not be arranged obliquely to the face of the frame but substantially perpendicular thereto.

The channel partitions 6 may be made without the transverse slot or groove 11ª, since the parts are made of sheet metal which is somewhat resilient, the partition plates 7 may be sprung into place, as shown in Fig. 8 of the drawings.

In assembling, the channel partitions may be inserted in the open sides of the frame members in the manner diagrammatically indicated in Fig. 5 of the drawings. The end frame members 3 and 3ª have their inner walls grooved in a manner corresponding to the grooves in the channel partitions to support the outer ends of the outside rows of partition plates 7.

Practically all portions of this improved test lens tray may be made of metal, celluloid, or other tough, readily cleansable material. Since the lens cells or chambers are entirely open at the top and are only slightly obstructed at the bottom by the lens retaining lugs, it is obvious that it may be readily cleansed by pouring upon and through it antiseptic fluids, or it may be immersed in a bath of such fluid or boiling water and thus at all times be kept thoroughly sterilized for safe use.

I claim as my invention:

1. An ophthalmic test lens tray comprising a frame, a pair of channel partitions, a plurality of partition plates movably supported on said channel partitions and forming a series of lens cells, a base partition plate also supported on said channel partitions and having flanges with inclined edges, whereby said partition plates are inclined at an angle to the face of the frame, and means for supporting lenses in said cells.

2. An ophthalmic test lens tray comprising a frame, a pair of channel partitions extending across said frame substantially parallel with each other and having their adjacent walls provided with longitudinal grooves, a plurality of partition plates forming a plurality of lens cells, and means on said plates adapted to slidably engage said grooves.

3. An ophthalmic test lens tray comprising a frame, a pair of channel partitions extending across the frame and having longitudinal grooves on their adjacent faces, a partition plate having projecting lugs at its ends adapted to enter the longitudinal grooves and be supported therein and to coöperate with an adjacent partition plate to form a lens cell, and means for supporting a lens in the cell.

4. An ophthalmic test lens tray comprising a frame, a pair of channel partitions extending across said frame, and provided with longitudinal grooves on their adjacent faces and transverse grooves communicating with the longitudinal grooves, and a partition plate having projecting lugs adapted to enter the longitudinal grooves through the transverse grooves and form a lens cell with an adjacent partition plate.

EDMUND KANDLER.